United States Patent
Yeh et al.

(10) Patent No.: US 6,427,206 B1
(45) Date of Patent: Jul. 30, 2002

(54) OPTIMIZED BRANCH PREDICTIONS FOR STRONGLY PREDICTED COMPILER BRANCHES

(75) Inventors: Tse-Yu Yeh, Milpitas; Mitchell Alexander Poplingher, Palo Alto; Monis Rahman, San Jose, all of CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/304,600

(22) Filed: May 3, 1999

(51) Int. Cl.[7] .................... G06F 9/305; G06F 9/42; G06F 9/38
(52) U.S. Cl. ................ 712/239; 712/240; 712/245; 712/236
(58) Field of Search ................ 712/228, 217, 712/233, 238, 234, 235, 129, 236, 237, 239, 241, 246, 226, 240, 245

(56) References Cited

U.S. PATENT DOCUMENTS

| | | | |
|---|---|---|---|
| 5,553,253 A | * 9/1996 | Pan et al. | 712/240 |
| 5,761,490 A | 6/1998 | Hunt | 712/239 |
| 5,848,269 A | 12/1998 | Hara | 712/239 |
| 5,867,698 A | * 2/1999 | Cumming et al. | 712/129 |
| 5,896,529 A | 4/1999 | Kulkarni et al. | 712/239 |

FOREIGN PATENT DOCUMENTS

| EP | 0 544 026 A1 | 2/1993 |
|---|---|---|

OTHER PUBLICATIONS

"Polymoric Branc Predictor," IBM Technical Disclosure Bulletin, U.S., IBM Corp., New York, vol. 37, No. 7, Jul. 1, 1994, pp. 109–113.

Hu, L., et al., "A Systematic Branch Strategy and Its Evaluation," IEEE International Conference on Systems, Man and Cybernetics, Cybernetics, U.S., New York, Oct. 14, 1996, pp. 1008–1013.

\* cited by examiner

Primary Examiner—Daniel H. Pan
(74) Attorney, Agent, or Firm—Blakely, Sokoloff, Taylor & Zafman LLP

(57) ABSTRACT

A microprocessor is disclosed. The microprocessor includes a branch prediction table that has at least one branch entry. The at least one branch entry includes a prediction field to indicate whether a branch is predicted taken. The at least one branch entry also includes a history register that stores history information. Moreover, the branch prediction table includes a prediction update logic that updates the prediction field and the history register except when a branch is strongly predicted statically.

28 Claims, 3 Drawing Sheets

OPTIMIZED BRANCH PREDICTIONS FOR STRONGLY PREDICTED COMPILER BRANCHES

BACKGROUND OF THE INVENTION

I. Field of the Invention

The present invention relates to the field of microprocessors. More specifically, the present invention relates to branch prediction in microprocessors.

II. Background Information

Computer programs typically include a large number of branch instructions which, upon execution, may cause instructions to be executed in a sequence other than the sequence set forth in the program memory. When a branch instruction is executed, execution continues either with the next sequential instruction from memory or execution jumps to an instruction specified by a branch target address. A branch specified by the branch instruction is said to be "Taken" if execution jumps to the instruction specified by the branch target address and "Not Taken" if execution continues with the next sequential instruction from memory.

Branch instructions are either unconditional or conditional. An unconditional branch is Taken every time the instruction is executed. A conditional branch instruction is Taken or Not Taken depending upon resolution of a condition which usually is a result of a logic statement. The instructions that are to be executed following a conditional branch are not known with certainty until the condition upon which the branch depends has been resolved. However, rather than waiting until the condition is resolved, state-of-the-art microprocessors perform branch prediction whereby the microprocessor tries to guess whether the branch will be Taken or Not Taken, so the instructions following the branch may be fetched and executed speculatively. If a branch is predicted to be Not Taken, the microprocessor fetches and speculatively executes the next sequential instruction after the branch from the memory. If the branch is predicted to be Taken, the microprocessor fetches and speculatively executes the instruction at the predicted branch target address. The instructions executed following the branch prediction are "speculative" because the microprocessor does not yet know whether the prediction will be correct or not. Accordingly, any operations caused to be performed by the speculative instructions may not be fully completed. For example, if a memory write operation is performed speculatively, the write operation may not be forwarded to a memory system until all previous branch conditions are executed successfully. Otherwise an instruction in a mispredicted path may improperly alter the contents of the memory.

If the branch prediction is ultimately determined to be correct, the speculatively executed instructions are retired or otherwise committed. In the example of a memory write, retirement is performed by forwarding the write operation to the memory system. If the branch prediction is ultimately found to be incorrect, then any speculatively executed instructions following the mispredicted branch are typically flushed from the system. In the memory write example, the write is not forwarded to the memory system but rather is discarded.

To expedite branch prediction, some state-of-the-art microprocessors include a branch prediction table (BPT) that provides a cache of the most recently predicted branches along with corresponding prediction information such as history of previous executions, also known as dynamic history, and/or predictions for that branch and the success thereof.

In addition to dynamic branch history, prediction mechanisms may also utilize compiler hints to aide the branch prediction. Usually, the compiler hints are determined using program profiling which is acquired by running a program with several sample data sets. From profiling a compiler, one may know whether or not a branch is likely to be taken and how certain the branch is taken or not taken. This information may be encoded into an instruction. However, to find out this information from the instruction, the instruction needs to be read from the instruction cache and decoded. The problem is that an instruction is decoded later in the pipeline. Therefore, the information encoded in the instruction is not available until several stages down the pipeline.

SUMMARY OF THE INVENTION

One embodiment of the present invention includes a microprocessor. The microprocessor includes a branch prediction table (BPT) that has at least one branch entry. The at least one branch entry includes a prediction field to indicate whether a branch is predicted taken. The at least one branch entry also includes a history register to store history information. Moreover, the BPT includes a prediction update logic to update the prediction field and the history register except when a branch is strongly predicted statically.

BRIEF DESCRIPTION OF THE DRAWINGS

The features, aspects, and advantages of the present invention will become more fully apparent from the following Detailed Description, appended claims, and accompanying drawings in which:

DETAILED DESCRIPTION OF THE INVENTION

Figure 1:
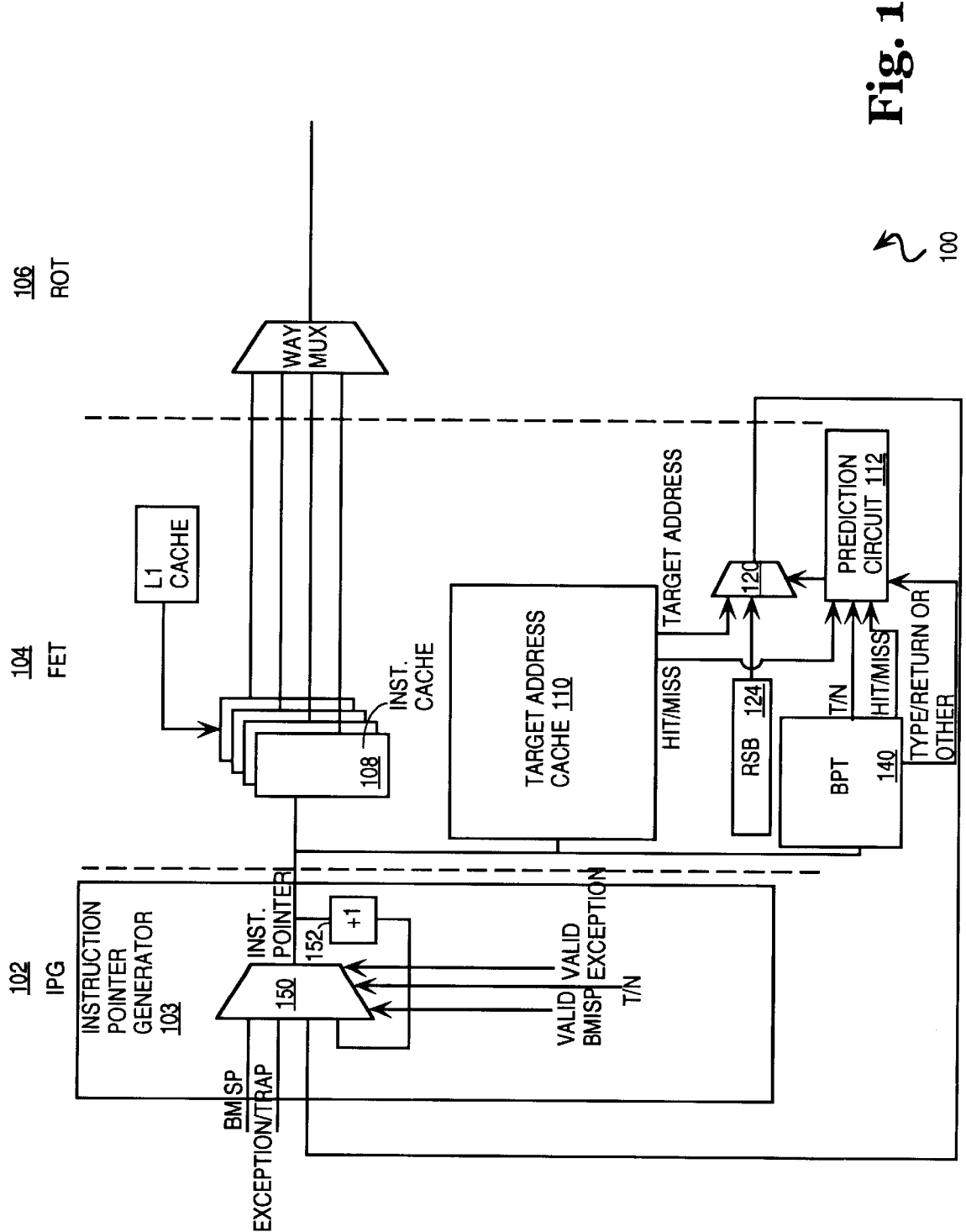
FIG. 1 is a block diagram illustrating a simplified embodiment of a microprocessor according to the present invention.

In the following description, numerous specific details are set forth to provide a thorough understanding of the present invention. However, one having ordinary skill in the art should recognize that the invention may be practiced without these specific details. In some instances, well-known circuits, structures, and techniques have not been shown in detail to avoid obscuring the present invention.

One embodiment of the present invention includes a microprocessor. The microprocessor has a branch prediction table (BPT) that has at least one branch entry. The at least one branch entry includes a prediction field to indicate whether or not a branch is predicted taken. The at least one branch entry also includes a history register to store history information. The BPT further has a prediction update logic that updates the prediction field and the history register except when a branch is hinted as strongly predicted statically.

The microprocessor further includes a compiler hint register that has a first field that, when asserted, indicates that a branch is strongly predicted statically. The compiler hint register also includes a second field that, when asserted, indicates whether a branch is predicted taken. The at least one branch entry further includes a field (hereinafter referred to as "strongly predicted/unconditional" (SP/U) field). The SP/U field is set as a result of a finding that a branch is unconditional and also as a result of a finding that a conditional branch, inserted into the branch entry, has strongly-predicted compiler hints. The SP/U field, when asserted, indicates that either a branch is strongly predicted or a branch is an unconditional branch.

The prediction field is coupled to the second field of the compiler hint register and to the prediction update logic. The prediction field may receive information indicating whether a branch is predicted taken either from the compiler hint or from a dynamic branch predictor that utilizes the prediction update logic. When SP/U is asserted, it is configured to prevent update of the history register or of both the history register and of the prediction field. As a result of the assertion of the SP/U field, the dynamic predictor is prevented from changing the compiler prediction or from changing both the compiler prediction and the history information.

It has been found that mispredictions are generally reduced if compiler hints are used. The embodiment of the microprocessor of the present invention permits the compiler hint register which indicates whether a branch is strongly predicted, to override the dynamic prediction algorithm implemented on-chip when the compiler is very certain of a branch's outcome—i.e., for strongly predicted branches. Using an allocation algorithm, based on the above description and the SP/U field in the BPT, prediction accuracy may be improved. In addition, by storing compiler prediction information in the BPT, this information is made available much earlier than otherwise would be after the decoding of the branch instruction because it takes the instruction a longer time to be decoded. Therefore, the embodiment of the microprocessor of the present invention allows for determining whether to use the native on-chip dynamic prediction or to override it with the compiler static hints before the instruction is decoded.

FIG. 1 illustrates in block diagram form a simplified embodiment of microprocessor 100 according to the present invention. Microprocessor 100 includes a plurality of pipeline stages, of which pipeline stage 102, 104 and 106 are illustrated. The pipeline stage 102, also called instruction pointer generation pipeline stage, generates the instruction pointer that points to an instruction in instruction cache 108. In the next pipeline stage 104, the fetch stage, an instruction is fetched from instruction cache 108 based on the instruction pointer generated in the prior pipeline stage. In the next pipeline stage, the rotate pipeline stage 106, an instruction is retrieved and decoded. In the absence of the apparatus and method of the present invention, a compiler prediction hint is not available until after an instruction is decoded in the rotate pipeline stage 106. In the embodiment of the microprocessor according to the present invention, the compiler prediction hint may be made available in the Fetch pipeline stage 104 if the branch has been seen before and has been allocated in the branch prediction table (BPT) 140.

BPT 140 provides a cache of the most recently predicted branches along with corresponding prediction information such as a brief history of previous executions and/or predictions for that branch and the success thereof. For example, a branch entry of BPT 140 may include a prediction field (not shown) that indicates whether or not a branch should be taken. In addition, a branch entry of the BPT includes a branch type field that indicates whether a branch is a CALL, a RETURN, a regular branch, etc. Microprocessor 100 has an Instruction Pointer Generator (IPG) 103 that generates an instruction pointer (IP). The IP specifies a new instruction to BPT 140 and to Instruction Cache (IC) 108 that stores instructions. In many implementations of pipelined microprocessors, BPT 140 may be accessed using a tag value provided within the instruction pointer and corresponding to tag values employed by the IC 108 for identifying cache lines therein.

Besides providing the instruction pointer to BPT 140 and to IC 108, IPG 103 provides the instruction pointer to a Target Address Cache (TAC) 110. The TAC 110 includes addresses of target instructions where a branch may be taken, if the BPT predicts that a branch is taken. If a branch is determined to be taken, TAC 110 drives an address, i.e., target address, of a target instruction to IPG 103. The target address driven by TAC 110 to the IPG 103 is decoded and then used as a regular instruction pointer to fetch a corresponding target instruction from IC 108. In such way, a fetch unit that may include IC 108 restarts fetching instructions from the new target address. In one embodiment of the present invention, BPT 140 and TAC 110 may be combined into one structure where each branch entry of the BPT also includes a target address of the branch.

Microprocessor 100 also includes a prediction circuit 112, a return stack buffer (RSB) 124, and a selecting device 120 that is coupled to TAC 110, to RSB 123, and to prediction circuit 112. Prediction circuit 112 has an input port thereof coupled to TAC 110 to receive a HIT/MISS signal therefrom. A second input port of prediction circuit 112 is coupled to BPT 140 to receive therefrom information as to whether a branch is taken or not taken. This information is stored into the prediction field of a BPT entry discussed above. Prediction circuit 112 further has a third input port thereof coupled to BPT 140 to receive from BPT 140 information with respect to whether there is a hit or miss in BPT 140. Furthermore, circuit 112 has a fourth input port coupled to BPT 140 to receive from BPT 140 information with respect to the type of branch. The type of a branch indicates whether a branch is of a RETURN type or of another type different from RETURN, such as CALL or regular types.

Based on the information received at the input ports thereof, prediction circuit 112 generates a control (select) signal to selecting device 120. Depending on the logic state of this signal, selecting device 120 selects one of the target addresses provided by TAC 110 and RSB 124. For example, a branch hits in BPT 140 and TAC 110, and the branch is predicted taken and is not of a RETURN type. The prediction circuit 112 generates a select signal to the selecting device 120 that results in the selection of the target address from TAC 110. The selecting device 120 provides the target address to one of the input ports of selecting device 150 of IPG 103.

Selecting device 150 has another input port coupled to an incrementor 152 that increments the instruction pointer by a predetermined value such as "1". The incremented pointer is fed back to selecting device 150 to be used as a new instruction pointer in cases where it is desired to fetch the next sequential instruction. Furthermore, selecting device 150 has two input ports to receive signals EXCEPTION TRAP and BRANCH MISPREDICTION (BMISP).

Selecting device 150 also has a plurality of select input ports that receive a plurality of select signals. One of these select signals is the taken/not taken (T/N) signal from BPT 140. Other signals include a valid exception signal (VALID EXCEPTION) and a valid branch misprediction signal (VALID BMISP) received from pipeline stages "located" further in the pipeline. Selecting device 150 may be configured to prioritize the instruction address signals input thereto according to a scheme where (1) first priority is conferred to an EXCEPTION/TRAP instruction address signal driven from a back end of the microprocessor; (2) second priority is conferred to a branch misprediction (BMISP) instruction address signal also driven from the back end of the microprocessor; (3) third priority is conferred to a target instruction address signal driven to selecting device 150 from selecting device 120; and (4) fourth priority is conferred to the incremented instruction pointer signal generated by incrementor 152. According to this priority scheme, if the select signals VALID BMISP and VALID EXCEPTION are not asserted and the branch is predicted taken, selecting device 150 selects at an output port thereof the target address received from selecting device 120.

A prediction algorithm controls prediction in the following way. When BPT 140 indicates a miss and TAC 110 indicates a hit, a branch is predicted as taken and the target address from TAC 110 is selected by selecting device 120 and fed to instruction pointer generator 103. If there is a BPT miss and a TAC miss, then it is determined that there is no branch entry. The instruction pointer generator 103 increments the current pointer and feeds the incremented current pointer back to the selecting device 150. If there is a hit in the BPT and a miss in the TAC and the BPT indicates that the instruction is of a RETURN type, prediction circuit 112 drives a select signal to selecting device 120 that results in a selection of a respective return address from the RSB 124. However, if there is both a hit in BPT 140 and a hit in TAC 110, and the branch is predicted taken, the prediction circuit 112 causes the target address from the TAC to be selected by selecting device 120.

In case where there is both a hit in BPT 140 and in TAC 110, but the branch is predicted not taken, the microprocessor proceeds with fetching the next sequential instruction in the cache 108 by generating a new pointer based on the incremented previous pointer. When there is a hit in the BPT 140, but a miss in the TAC 110 and the instruction is of a regular type, the target address may be calculated from the instruction after the instruction is decoded.

In the embodiment of the microprocessor of the present invention described herein, the compiler is configured to encode the "compiler hints" into an instruction as two-bit prediction information. The two-bits dedicated to encode compiler hints are set according to the likelihood that a branch is taken or not taken. The two bits encode four different types of possibilities for branch prediction: likely non-taken, likely taken, strongly not-taken, and strongly taken predictions. In the following description, the strongly taken and strongly not-taken branches are termed "static taken" and "static not-taken" branches respectively because the branch is better predicted using the static hint provided by the compiler. The likely taken and likely not-taken branches are termed "dynamic taken" and "dynamic not-taken" branches respectively because the branch is better predicted using a dynamic predictor. In the following description, "static" and "strongly" and "dynamic" and "likely" are used interchangeably.

The compiler determines a "taken rate" using program profiling that runs a program with sample data sets and collects the branch outcome statistics. The "taken rate" may be from zero percent up to one hundred percent. When the "taken rate" is between zero and a certain percent "X", say approximately ten percent, the branch is very likely to be "not taken" and the two bits may encode the prediction as being "static not taken." When the "taken rate" is between approximately ten and a certain percent "Y", say approximately fifty percent, the prediction is likely "dynamic non-taken." When the "taken rate" is between approximately fifty percent and a certain percent "Z", say approximately ninety percent, the prediction is likely "dynamic taken." When the "taken rate" is between "Z" and one hundred percent, the prediction is very likely "static taken."

The percent figures X, Y, and Z are established based on comparison with the accuracy of the dynamic branch predictor implemented in the microprocessor. For example, a dynamic branch predictor typically predicts with 90% accuracy. If the compiler has an accuracy that is greater than 90%, the compiler hint may be used instead of dynamic predictor. Therefore, when a branch is very likely "taken", the two encoded bits may be used to override whatever the BPT dynamic predictor indicates because the compiler has good confidence that a branch will be taken.

When a "static not-taken" branch is encountered, typically there is no instruction flow change. Therefore, there is no need to cache that branch in the BPT. When the information encoded in an instruction indicates that there is a likely taken or likely not taken prediction, the compiler is not very sure whether the branch should be taken or not taken. In this case, BPT 140 is used for dynamically predicting the behavior of branches. Dynamic prediction utilizes the history of a branch, recorded in the BPT, to predict the outcomes of upcoming branches. If the microprocessor that implements the embodiment of the present invention described herein has BPT prediction—i.e. dynamic prediction available, it may utilize the BPT prediction to determine whether a branch should be taken or not taken. If the BPT prediction is not available or the microprocessor wants to override the BPT prediction, the microprocessor may use the taken/not-taken field of the two-bit compiler hint to determine whether a branch should be taken or not taken. In one embodiment of the present invention, the two encoded bits are part of a 41 bit instruction, and are written by the compiler into the instruction, but the present invention is not limited in scope to 41-bit instructions. The length of an instruction is such that in each instruction there are at least two bits dedicated to encode the compiler hints.

Generally, branches that are stored in the BPT are branches that are likely to cause instruction flow changes. Typically, these branches are cached both in the BPT as well as in the TAC. Following an allocation process, described later in this section, branches missed in the BPT are predicted as not-taken by default until the compiler prediction hints are available from decoding the instructions. Unlike "static not-taken" branch instructions, "dynamic not-taken" branch instructions are more likely to be taken at some point in time. Therefore information relating to "dynamic taken" or "dynamic not taken" branches is stored into the BPT.

For a regular conditional branch, one may insert the target address into the TAC without inserting it into the BPT. For a very likely taken branch such as a "static taken" branch, as long as the target address is in the TAC, it does not matter whether the history of the branch is in the BPT or not as the history of that branch, is not utilized by the prediction. In one embodiment of the microprocessor of the present invention, when an address hits in TAC but misses in BPT, the branch is automatically predicted as taken with the target address from the hit TAC entry. However, CALL and RETURN instructions with "static taken" hints, are written into BPT, because these two types of branches may influence the return stack buffer (RSB) 124. Therefore, CALL and RETURN information may be written in BPT 140, so BPT 140 may provide the CALL/RETURN type before branches are decoded.

Figure 2:
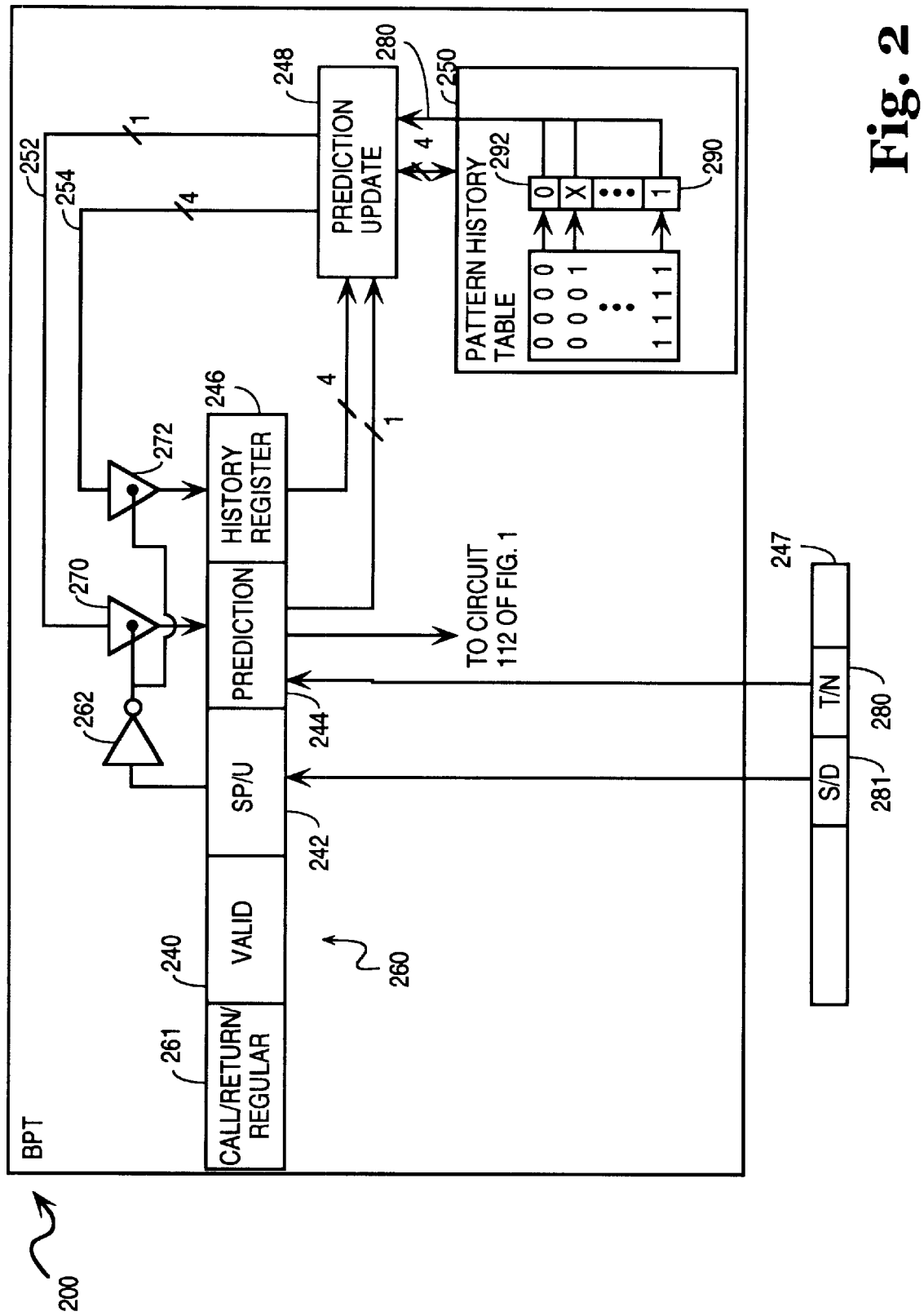
FIG. 2 is a block diagram illustrating a branch prediction table with an entry thereof and other structures of the branch prediction table according to one embodiment of the present invention.

FIG. 2 shows a view of a branch prediction table (BPT) 200. For each branch instruction, BPT 200 has a branch entry 260. Branch entry 260 includes several fields including a valid bit field 240, a strongly predicted/unconditional (SP/U) field 242, a prediction field 244, a branch type field (CALL/RETURN/REGULAR) 261, and a history register 246. In one embodiment, each of the SP/U and prediction fields 242 and 244, respectively, include 1 bit, while the history register 246 includes 4 bits. It should be appreciated that the above-mentioned fields are not limited in size to a specific number of bits, but may be implemented with different number of bits. Hereinafter, the SP/U and prediction fields 242 and 244 will be referred to as "SP/U bit 242" and "prediction bit 244." The valid bit 240 indicates whether the branch in entry 260 is valid or not. The SP/U bit 242 indicates whether a branch is conditional or unconditional or whether the branch is strongly predicted. A regular conditional branch includes non-return and non-call types of branches. Typically, for a conditional branch the prediction may change in time based on the execution history.

The prediction bit 244 and the history register 246 are coupled to a prediction update logic circuit 248. The prediction update logic circuit 248 is coupled to pattern history table 250. Prediction update logic circuit 248 may implement a two-level prediction algorithm such as the "Tse-Yu Yeh two-level prediction algorithm". For more information about this algorithm see "T-Y Yeh and Y. N. Patt "Alternative Implementations of Two-Level Adaptive Branch Prediction," Proceedings of the 19$^{th}$ International Symposium on Computer Architecture, pp. 124–134, May, 1992.

Typically, prediction bit 244 and history register 246 are updated by prediction update logic circuit 248. However, for an unconditional branch or static taken and static not-taken branches, the prediction does not change in time—the prediction remains either taken or not taken. To avoid changes in prediction in those cases, the SP/U bit 242 is configured to prevent the prediction bit 244 and the history register 246 from getting updated by prediction update logic circuit 248.

The SP/U bit 242 is coupled via an inverter 262 to tristate buffers 270 and 272 that control writing to prediction bit 244 and to history register 246 respectively. When the SP/U bit 242 is set, the prediction update logic circuit 248 is prevented from updating the prediction bit 244 and history register 246 because tristate buffers 270 and 272 are tristated. Inverter 262 inverts the logic signal from the SP/U bit 242, generating a logic "0" to the enable ports of tristate buffers 270 and 272. Once the SP/U bit 242 is set, the prediction bit of the prediction field 244 is written to by the second field (T/N) 280 of the computer hint register 247. However, when the SP/U bit 242 is deasserted to "0", the tristate buffers 270 and 272 permit update of the prediction bit 244 and of the history register 246 with information from prediction update circuit 248 according to the two-level prediction algorithm mentioned above.

In the embodiment of the microprocessor according to the present invention, when a branch is "static taken", the history register is set to "1111". When the history register has all its bits set to "1", a branch is predicted taken. Pattern history table 250 has the entry 290 corresponding to "1111" hard wired to "1" to always predict taken when the history register content is "1111." This indicates that a branch is taken all the time. When a branch is "static not taken", the history register is set to "0000". The pattern history table has the entry 292, corresponding to "0000" entry, hard wired to "0" to always predict "not-taken" when the history register's content is "0000." By hard wiring entries "0000" and "1111" to "0" and "1", respectively, the prediction does not change, as opposed to situations where the entries in the pattern history table 250 learn from execution history and modify their predictions accordingly.

Therefore, for "static taken" branches the SP/U bit 242 is set and the history register retains the initial value "1111" as long as the branch still exists in the BPT. For "static not-taken" branches, the SP/U bit 242 is set and the history register retains the initial value of "0000". If the compiler hint indicates that there is a "dynamic taken" or "dynamic not taken" prediction, the SP/U bit 242 is cleared, regular dynamic prediction is utilized with the prediction bit 244, and the branch history register 246 updated by prediction update 248.

Figure 3:
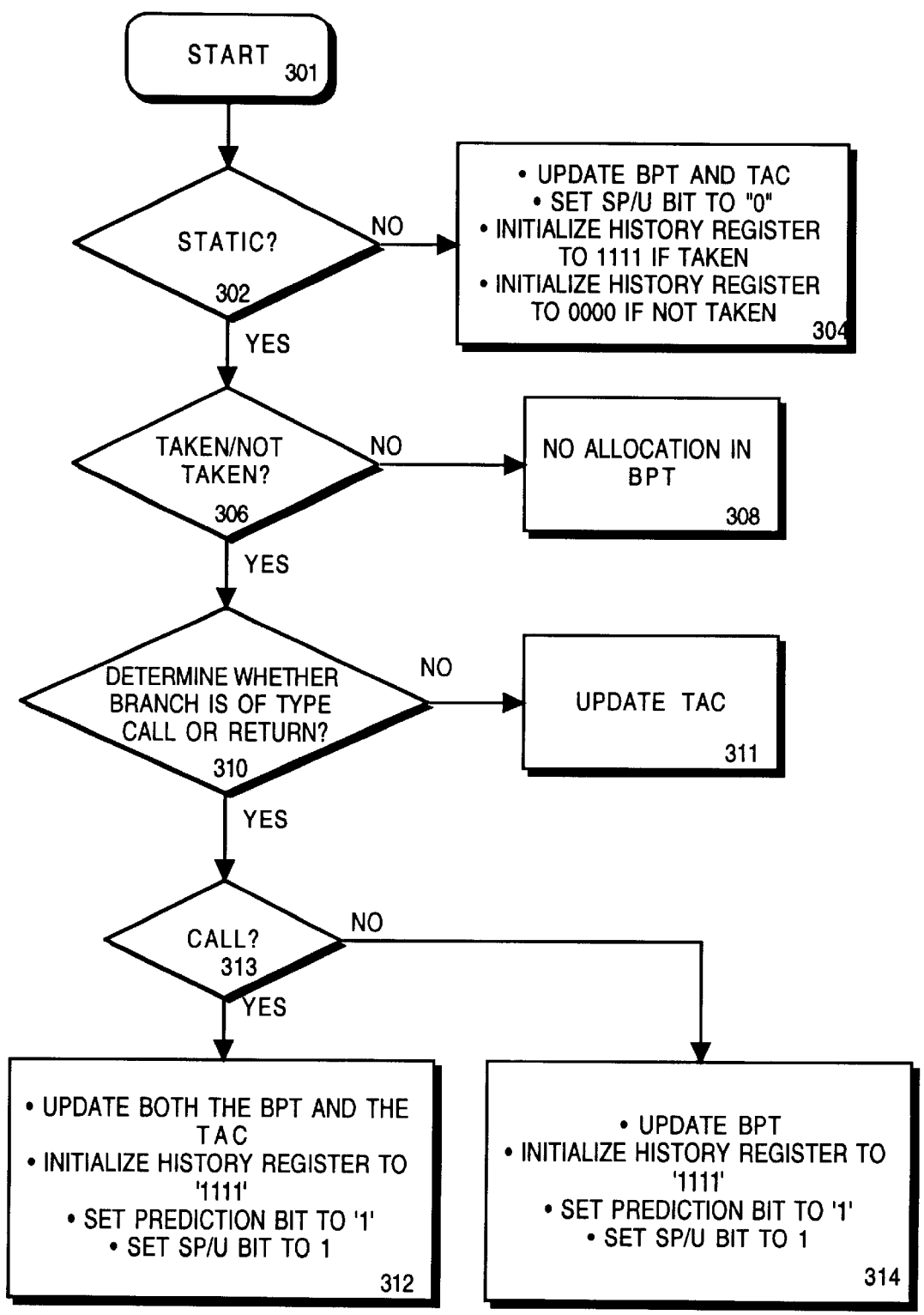
FIG. 3 illustrates a flow chart diagram in connection with an embodiment of a method of allocating a branch according to the present invention.

FIG. 3 illustrates a flow chart diagram in connection with a process for allocating a branch according to one embodiment of the present invention. The process starts at block 301 from where it flows to decision block 302. At decision block 302 it is determined from the compiler hints, i.e., the two encoded bits, whether a branch is static. If the branch is not static but dynamic, the process flows to block 304. At block 304 the BPT and the TAC are updated. The update typically includes writing into the TAC a target address that was last used and writing in the BPT the branch information. The SP/U bit 242 is set to "0" to allow update of the history register and of the prediction bit by the prediction update logic circuit. Dynamic prediction is used from then on. If the branch is predicted taken, the history register is initialized to 1111 (or to some pattern that is likely to yield a taken prediction). If the branch is predicted not taken, the history register is initialized to 0000 (or some pattern that is likely to yield a not-taken prediction).

However, if at decision block 302 it is determined that the branch is static, the process flows from decision block 302 to decision block 306 where it is determined whether the branch is "Taken" or "Not Taken". If the branch is "Not Taken", i.e., the branch is "Static Not Taken", the process flows to block 308. No allocation is performed into the BPT. When a branch is hinted as strongly not-taken, the branch's information is not inserted into the prediction table, because the default branch prediction is already "not-taken." However, if the branch is taken, the process flows to decision block 310 where it is determined whether branch is of a "CALL" or "RETURN" type. If the branch is not of a CALL or RETURN type, the process flows to block 311 where the TAC is updated. This is so as when a branch is very likely to be taken, as in the "static taken" case, one need not waste space in the BPT to store the history.

If the branch is of a CALL or RETURN type, the process flows to decision block 313 where it is determined whether the branch is of a CALL type. If the branch is of a CALL type, the process flows to block 312 where both BPT and the TAC are updated. The history register information is initialized to "1111", and the SP/U bit 242 is set to 1. BPT is updated to record information regarding the branch type, such as CALL, RETURN or regular. The branch type information is used to update other branch prediction structures. For example, the return stack buffer (RSB) may be updated with the "type" of information after the prediction is made. After a "CALL", the return address is pushed onto the RSB. After a "RETURN", the top of stack is popped out.

However, if at decision block 313 it is determined that the block is of a RETURN type, the process flows to block 314 where the same actions, as the actions at block 312, are taken with one exception. The TAC is not updated, because RETURN addresses are predicted using the RSB instead of the TAC.

In the previous detailed description, the invention is described with reference to specific embodiments thereof. It will, however, be evident that various modifications and changes may be made thereto without departing from the broader spirit and scope of the invention as set forth in the claims. The specification and drawings are, accordingly, to be regarded in an illustrative rather than a restrictive sense.

What is claimed is:

1. A microprocessor comprising:
    a branch prediction table having,
        at least one branch entry that includes a prediction field, to indicate whether a branch is predicted taken, and a history register to store history information,
        a prediction update unit to selectively update said prediction field and said history register, and
        a compiler hint with a first field that when asserted indicates that a branch is strongly predicted statically.

2. The microprocessor of claim 1, said compiler hint further including a second field that when asserted indicates that a branch is predicted taken.

3. The microprocessor of claim 2, said prediction field coupled to said second field of said compiler hint.

4. The microprocessor of claim 2 wherein the prediction update unit is prevented from updating the prediction field and history register when the strongly predicted statically field in the compiler hint in the branch entry is asserted.

5. The microprocessor of claim 2 wherein the compiler hints are generated by a compiler after profiling an instruction and the hint is encoded in the instruction for later decoding by the microprocessor.

6. The microprocessor of claim 1 further including a pattern history table coupled to said prediction update unit.

7. The microprocessor of claim 1, said at least one branch entry includes a strongly predicted/unconditional field to indicate whether a branch is one of a strongly predicted branch and an unconditional branch.

8. The microprocessor of claim 7, said strongly predicted/unconditional field coupled to said first field of said compiler hint branch.

9. The microprocessor of claim 7, said at least one branch entry includes a field indicating whether said branch is one of a CALL, RETURN, and regular type.

10. The microprocessor of claim 9, a target address cache is updated when said branch is determined strongly predicted taken and is neither of a CALL nor of a RETURN type.

11. The microprocessor of claim 10, said branch prediction table and a target address cache are updated, said history register is initialized to a taken type, and said prediction and strongly predicted/unconditional fields are asserted, when said branch is determined strongly predicted taken and of a CALL type.

12. The microprocessor of claim 10 said branch prediction table is updated, said history register is initialized to a taken type, said prediction and strongly predicted/unconditional fields are asserted, and the target address cache is not updated when said branch is determined strongly predicted taken and of a RETURN type.

13. The microprocessor of claim 7, said branch prediction table and a Target Address Cache (TAC) are updated, said SP/U field is deasserted, and said history register is initialized to a taken type, when said branch is predicted dynamic taken.

14. The microprocessor of claim 7, said branch prediction table and a Target Address Cache (TAC) are updated, said SP/U field is deasserted, and said history register is initialized to a non-taken type, when said branch is predicted dynamic not-taken.

15. The microprocessor of claim 1, said at least one branch entry includes a valid field to indicate whether said branch entry is valid.

16. In a microprocessor a method for allocating a branch, the method comprising:
    determining whether a branch is strongly predicted taken by examining a compiler hint; and
    if the branch is strongly predicted taken and of a CALL type, updating a branch prediction table and a target address cache,
    initializing a history register to a taken type, and
    asserting a prediction field and an strongly predicted/unconditional field.

17. The method of claim 16 further including, when said branch is strongly predicted taken and of a RETURN type,
    updating said branch prediction table,
    initializing a history register to a taken type, and
    asserting said prediction field and said strongly predicted/unconditional field.

18. The method of claim 16 further including updating said target address cache when said branch is determined strongly predicted taken and is neither of a CALL type nor of a RETURN type.

19. The method of claim 16 further including when said branch is dynamically predicted taken,
    updating said branch prediction table and said target address cache, and
    deasserting said strongly predicted/unconditional field, and initializing a history register to taken.

20. The method of claim 16 further including, if said branch is dynamically predicted not-taken,
    updating said branch prediction table and said target address cache,
    initializing said history register to not-taken, and
    deasserting said strongly predicted/unconditional field.

21. A microprocessor comprising:
    a compiler hint register including a first field, to indicate whether a branch is one of strongly predicted statically and unconditional, and a second field to indicate whether the branch is predicted taken; and
    a branch prediction table including,
    at least one branch entry that includes a prediction field, to indicate whether a branch is predicted taken, and a history register to store history information,
    prediction update unit to selectively update said prediction field and said history register.

22. The microprocessor of claim 21 further including a pattern history table coupled to said prediction update logic.

23. The microprocessor of claim 22, said at least one branch entry includes a strongly predicted/unconditional field to indicate whether a branch is one of a strongly predicted branch and an unconditional branch.

24. The microprocessor of claim 21, said at least one branch entry includes a field indicating whether said branch is one of a CALL, RETURN, and regular type.

25. The microprocessor of claim 24, said branch prediction table and a target address cache are updated, said history register is initialized to a taken type, and said prediction and strongly predicted/unconditional fields are asserted when the branch is strongly predicted taken and of a CALL type.

26. The microprocessor of claim 24, said branch prediction table is updated, said history register is initialized to a taken type and said prediction and strongly predicted/unconditional fields are asserted, when said branch is strongly predicted taken and of a RETURN type.

27. The microprocessor of claim 24, a target address cache is updated when said branch is strongly predicted taken and neither of a CALL nor of a RETURN type.

28. The microprocessor of claim 24, said branch prediction table and a target address cache are updated, said strongly predicted/unconditional field is deasserted, and said history register is asserted to a taken type, when said branch is dynamically predicted taken.

* * * * *